United States Patent
Hosseinian et al.

[11] Patent Number: 5,088,771
[45] Date of Patent: Feb. 18, 1992

[54] TUBE UNION

[75] Inventors: Amir P. Hosseinian, Beverly Hills; John L. Binford, Lake Elsinor, both of Calif.

[73] Assignee: Sierracin Corporation, Sylmar, Calif.

[21] Appl. No.: 479,648

[22] Filed: Feb. 6, 1990

[51] Int. Cl.$^5$ ............................................. F16L 35/00
[52] U.S. Cl. ................................ 285/39; 285/382.2; 285/417; 285/921
[58] Field of Search ............... 285/382.2, 382.7, 417, 285/39, 94

[56] References Cited

U.S. PATENT DOCUMENTS

| | | |
|---|---|---|
| 964,052 | 7/1910 | Pflugh . |
| 1,186,812 | 6/1916 | McFerran . |
| 1,186,813 | 6/1916 | McFerron ............ 285/417 X |
| 2,310,744 | 2/1943 | Osborn ............ 285/382.7 X |
| 2,366,341 | 2/1944 | Lappin . |
| 2,613,959 | 10/1952 | Richardson ............ 285/382.7 X |
| 2,741,498 | 4/1956 | Elliott . |
| 3,149,860 | 1/1961 | Hallesy . |
| 3,262,721 | 7/1966 | Knight ............ 285/921 X |
| 3,375,026 | 3/1968 | Szohatsky . |
| 3,451,697 | 6/1969 | Bular ............ 285/39 X |
| 3,474,519 | 10/1969 | Hallesy . |
| 3,498,648 | 3/1970 | Hallesy ............ 285/417 X |
| 3,675,949 | 7/1972 | Dawson . |
| 3,765,708 | 10/1973 | Pease et al. . |
| 3,827,727 | 8/1974 | Moebius . |
| 3,893,720 | 7/1975 | Moebius . |
| 4,025,092 | 5/1977 | Wakefield . |
| 4,026,006 | 5/1977 | Moebius . |
| 4,061,367 | 12/1977 | Moebius ............ 285/417 X |
| 4,257,135 | 3/1981 | Moebius . |
| 4,482,174 | 11/1984 | Puri ............ 285/382.2 X |
| 4,705,302 | 11/1987 | Beiley ............ 285/382.2 X |
| 4,844,517 | 7/1989 | Beiley et al. . |

FOREIGN PATENT DOCUMENTS 2140117A 11/1984 United Kingdom .

OTHER PUBLICATIONS

"H" Repair Fitting for Aircraft Fluid Systems. Operational pamphlet from Sierracin/Harrison, Dec. 1989.

Primary Examiner—David W. Arola
Attorney, Agent, or Firm—Charles Berman

[57] ABSTRACT

A tube union for coupling the ends of a pair of tubes which are butted together includes a sleeve and two swaging collars about the sleeve without other components. Grooves and lands in the sleeve mate with a tube which is deformed into the grooves as the sleeve is urged inwardly under compression. The rings are urged centrally towards the central position of the sleeve by a tool constituted by two housing members which each have several components. Torsional wrenching of the housing members screws the housing members together, causing the collars to deform the sleeve. Thereafter pins are removed from the one housing members and the wrench from the other. This permits separation of the housing members from the swaging collars. The tool can effect connection or assembly of different elements.

21 Claims, 3 Drawing Sheets

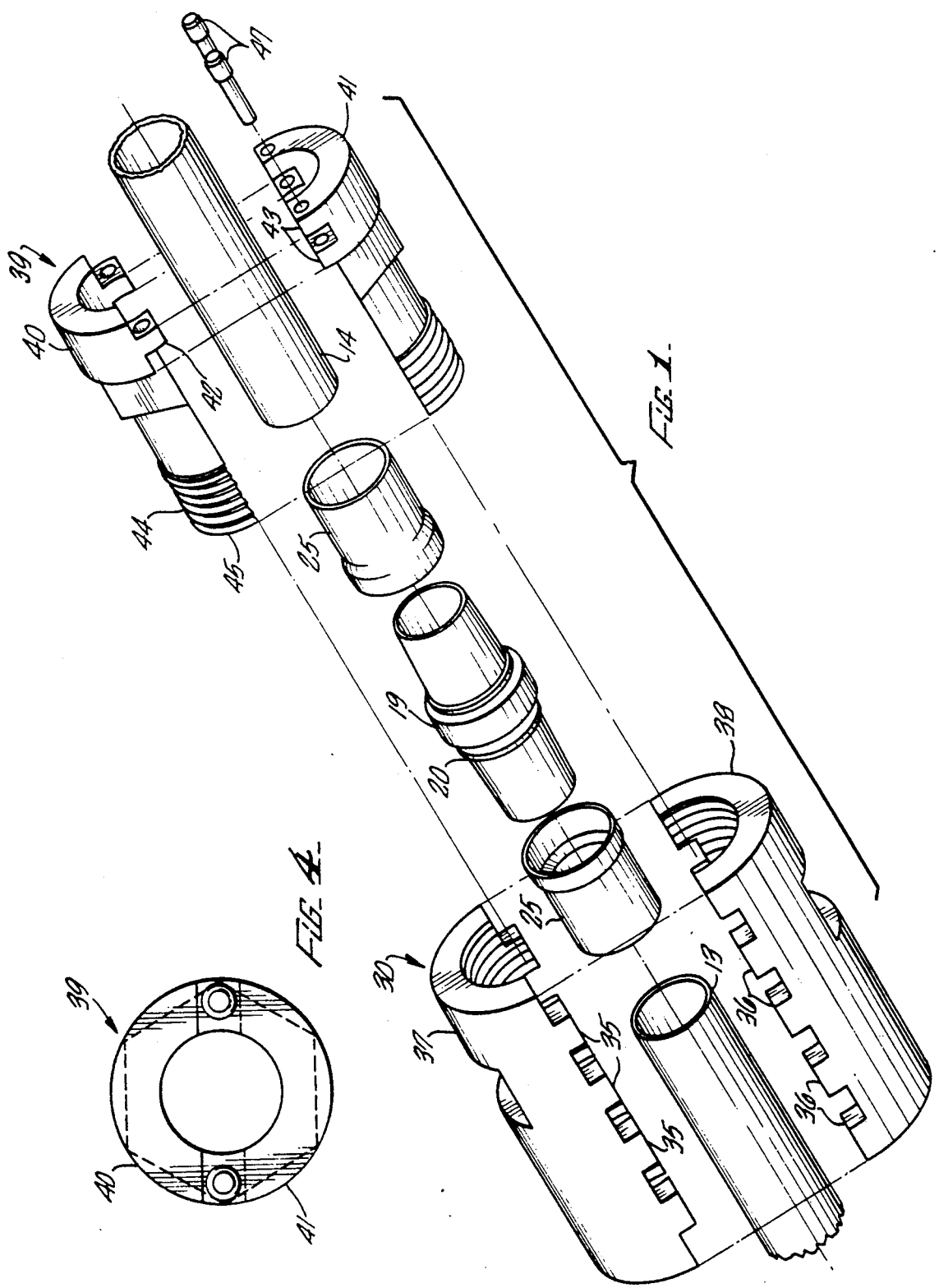

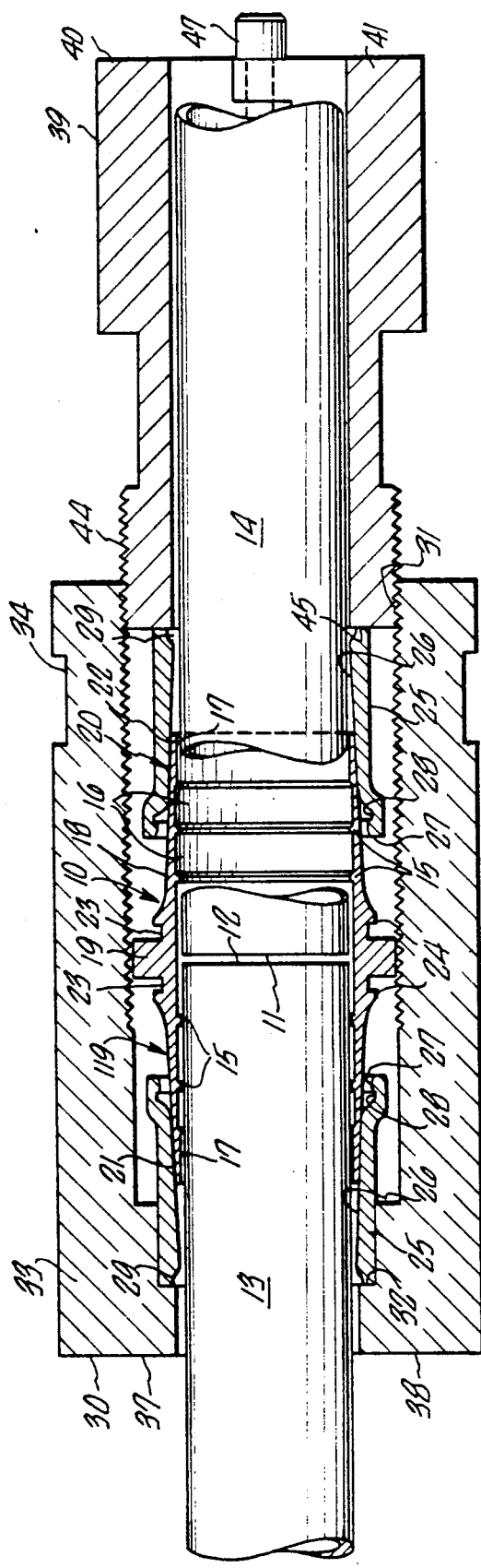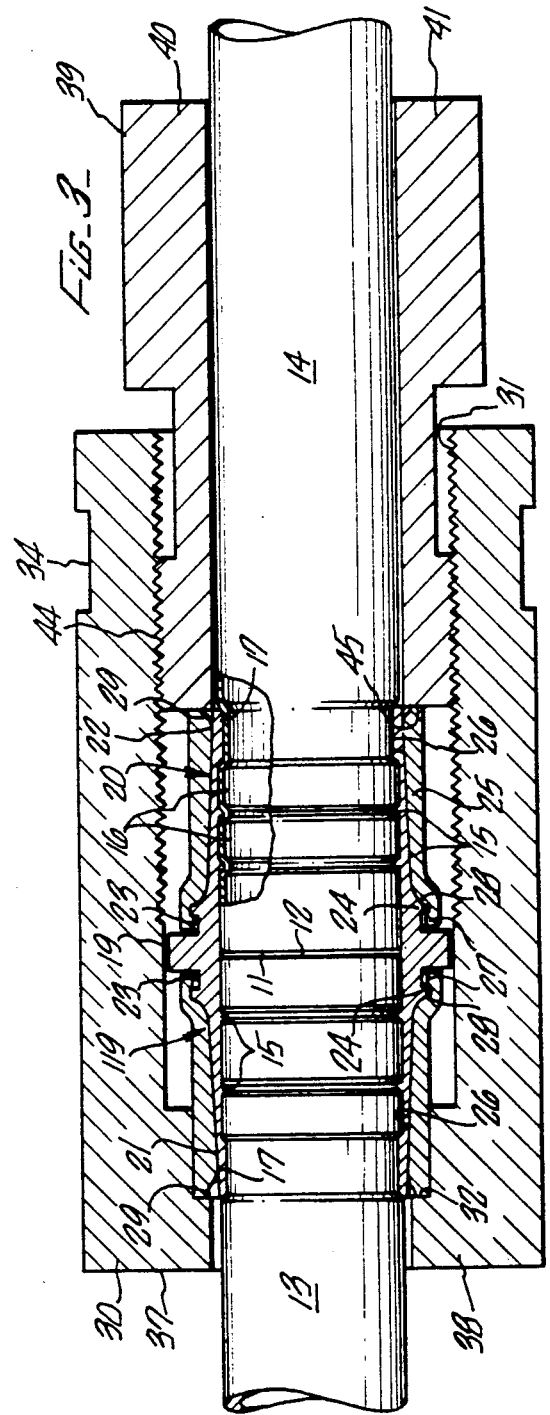

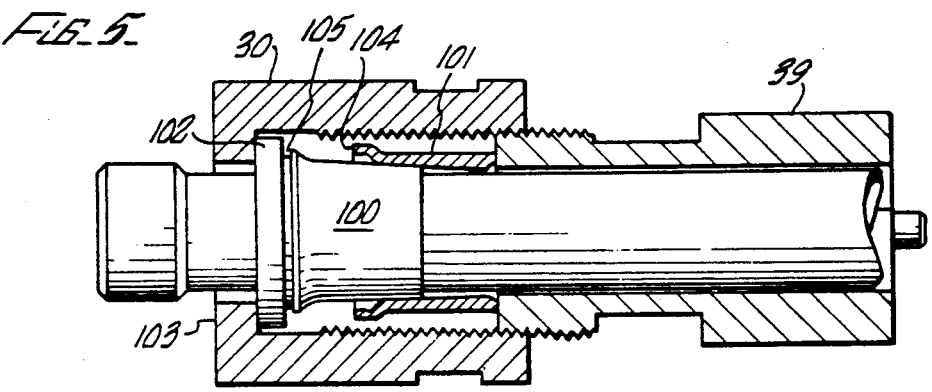
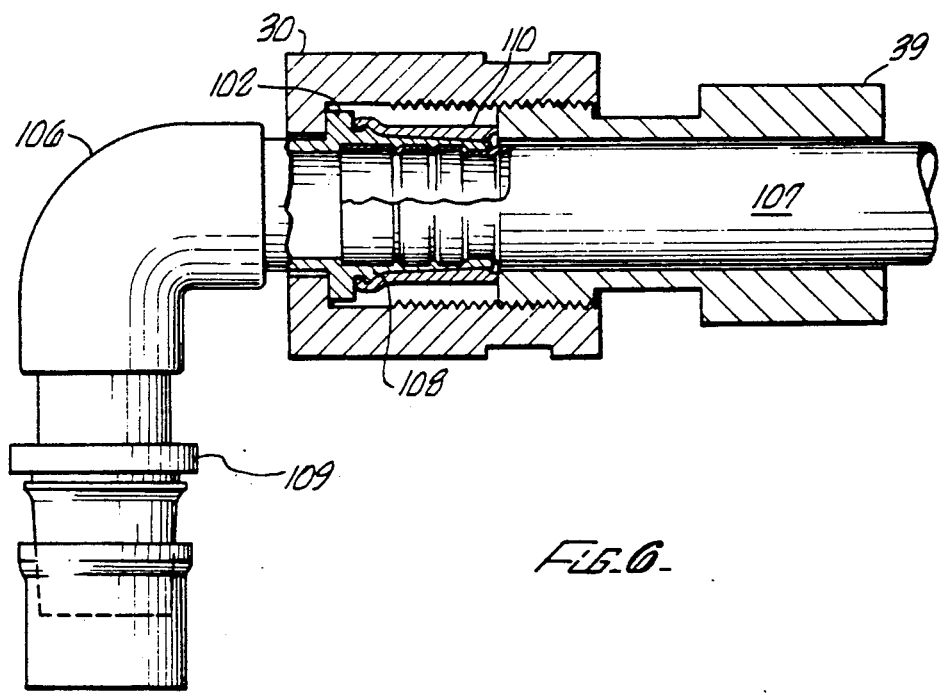

TUBE UNION

BACKGROUND

Unions for tubing should effect a stable sealing joinder of the tubes without leakage of fluid from the tubes through the union.

This invention relates to affixing two elements together such as joining the ends of tubes with a union. In particular, the invention is concerned with the joinder of tubes which are thin walled and of light weight, have high strength, and are used typically in the aircraft industry.

It is known to connect the ends of tubes with a swaging sleeve which fits over the ends of the abutting ends of tubes. The swaging sleeve has a internal groove and land formation and an external tapered formation. An abutting collar on the outside surface of the sleeve causes the sleeve to deform inwardly. This in turn causes the ends of the walls of tubes to deform into mating relationship with the grooves and lands. This creates an effective seal between the sleeve and the ends of the tubing.

The construction for creating this engagement requires at least the collar over the outside surface and usually two more interengaging screw-threaded members over the sleeve which are permanently housed about the sleeve. The interengaging housing members are screw-threaded together by wrenching action on the housing members. This affects the union assembly.

If the housing members are reverse screwed from the sleeve, a collar could be removed. This would leave only the sleeve and butting tube ends. There would be no security between the butting tube ends and the sleeve. Additionally, there is no way to remove the housing members from the tubing. As the housing members are relatively sturdy elements, they add considerable weight to the union. Naturally, in aircraft use, excess weight should be avoided.

Accordingly, an object of the present invention is to provide a union assembly with a minimum number of components. The union should effectively provide for sealing engagement between the ends of tubing in a positive manner to avoid leakage.

Another object of the invention is to provide a mechanism and method for affixing two elements together and to leave the elements so assembled with a minimum number of components and preferably in a means of sealing relationship between the elements.

SUMMARY

By this invention, a union assembly with the minimum of components and a simplified method of connection is provided. Also provided is an assembly of elements connected in a simplified manner.

According to one aspect of the invention, a tube union assembly for coupling the ends of tubes comprises a sleeve for positioning centrally over a pair of tubes having their ends abutted together. The sleeve has an internal surface with circumferentially spaced apart lands and grooves. The external surface of the sleeve has a pair of tapered external surfaces decreasing in diameter from a central portion towards the opposite ends of the sleeve. Swaging collars with a tapered inner surface complimentarily engage the tapered surface of the sleeve.

As the collars are urged towards the central portion of the sleeve, the sleeve is deformed inwardly and the tube is deformed into mating relationship with the grooves and lands. An effective sealing union is achieved with only the sleeve and swage collars.

The collars and sleeve are swaged with a tool formed by means of a housing formed of two members, each having two components. The two components of each member are longitudinally axially separable and are arranged for threaded interengagement with each other. As interengagement increases, so the swage collars are urged towards each other, namely towards the central portion of the sleeve. Pin formations interact with each component of at least one housing member. Removal of the pins permits for separation of the components of each housing member.

By this construction a light weight union assembly is achieved for coupling ends of a pair of thin walled tubes. Typically such tubes are of light weight high strength material for use in the aircraft industry where high pressure hydraulic systems operate at between 3,000 to 6,000 psi in the tube lines.

Other aspects of the invention employ the tool to connect two elements together so as to be selectively separable or removed. The elements may be respectively an end to a coupling and a sleeve. The sleeve coupling in turn may be selectively removably coupled with another element.

In yet another aspect at least one of the elements forms part of an elbow or other component which may be in the same or different longitudinal lines. Thus an elbow can have two right angularly directed longitudinal lines. One limb of the elbow can be considered as one pipe end which is connected into the face end of an abutting pipe end.

The invention is further described with reference to the accompanying drawings.

DRAWINGS

FIG. 1 is an axial exploded view of a tube union with individual parts of the assembly in relationship with tubes.

FIG. 2 is an axial cross-section illustrating the two components of each housing member in unassembled relationship.

FIG. 3 is an axial cross-section of FIG. 2 after the tube union is tightened with swage collars in abutting relationship within the sleeve.

FIG. 4 is an end view of the union illustrating the pins for affecting interengagement of the component part of one housing member.

FIG. 5 is a diagrammatic axial view illustrating the sealing connection of two elements which can be selectively separated.

FIG. 6 is a diagrammatic axial view illustrating the sealing connection of two elements, at least one of which constitutes parts of an elbow configuration or shape.

DESCRIPTION

A tube union assembly for coupling the ends of a pair of thin walled tubes constructed of light weight, high strength material, such as used in the aircraft industry comprises a sleeve 10 positioned centrally over ends 11 and 12 of tubes 13 and 14 respectively. The ends 11 and 12 are in abutting relationship or close proximity and in effective nesting engagement. The tubes are of a titanium alloy, corrosion resistant steel, or aluminum alloy of the nature to withstand several thousands psi of hydraulic pressure.

The sleeve 10 includes several circumferential lands 15 and spaced grooves 16. The lands 15 have a longitudinal length shorter than the longitudinal length 16 of the grooves. The end lands 17, namely adjacent the extremities of the sleeve 10, have a longitudinal length substantially equal to the longitudinal length of the grooves 16. The depth of the grooves 16 are substantially less than the length of the grooves 16. The depth is substantially equal to the longitudinal length of the lands 15. The interface between the lands and grooves is substantially right angular so as to form teeth like formations as viewed in cross section.

The external surface 18 of the sleeve 10 has a central portion 19 of enlarged diameter. A pair of tapered external surfaces 119 and 20 have decreasing diameter from the maximum near the central portion 19 to a minimum diameter near the opposite ends 21 and 22 of the sleeve 10. Between the central portion 19 and the maximum height of the tapered portion are circumferential slots 23 which butt the central portion 19. The maximum height 24 of the tapered portions constitutes circumferential lips about the sleeve 10.

A pair of swaging collars 25 are positioned in a butting relationship with the sleeve 10. The collars 25 have a tapered inner surface 26 for complimentary engagement with the tapered surfaces 119 and 20 of the sleeve 10. Around the periphery of the end of the collars 25 intended for location towards the central portion 19, there is provided a ring 27 and a circumferential slot 28. The slot 28 is accommodated in the circumferential lip of the sleeve 10. At the opposite end of each of the collars 25, namely the ends, remote from the central portion 19, there is a circumferential slot 29.

The collars 25 are forced onto the sleeve 10 such that the lips interengage with the slot 28. A firm and positive location is then achieved between the sleeve 10 and the collars 25. An effective seal is thus achieved between ends 11 and 12 of tubes 13 and 14 and the inside surface of the sleeve 10. As the collars 25 are drawn towards the central portion 19, the sleeve is radially compressed inwardly to deform both the inner and outer surfaces of the walls of the tubes 13 and 14. This bending action caused by the lands 15 of the sleeve 10 reduces the diameter of the walls of the tubing 13 and 14 adjacent the lands 15 by an equal amount. This is in the order of the thickness of the walls of the tubes 13 and 14. The tubes are bent outwardly into the regions occupied by grooves 16 such that the tubes 13 and 14 are formed into a series of ring joints involving indentations and convolutions corresponding to the lands 15 and grooves 16. This affects a permanent union of the tube ends 11 and 12.

This union of the tube ends 11 and 12 is such that the internal pressure within the tubing 13 and 14 aids in tightening and securing the joints within the grooves 16 to enhance the tensile property of the joint. As such there are only the three components necessary which form an effective union assembly.

The swaging collars 25 are drawn towards the central portion 19 of the sleeve 10 by means of a swaging tool formed by a housing construction. The tool consists of a housing 30 which is formed of a first housing 30 which is constructed by two interlocking components and a second housing 39 also formed of two interlocking components. The housing 30 entirely surrounds the central portion 19 of the sleeve 10 and has internal threads 31 at one longitudinal end and an internal shoulder 32 at the opposite end 33. The housing additionally provides an external wrenching surface 34.

Along a longitudinal line parallel to the axis of the tubing and the axis of the sleeve and the collars, there is provided in diametrically opposite positions tooth formations 35 and 36 respectively. With a wrenched tool on the wrenching surface 34, the two components 37 and 38 making up the housing 30 are held in interengaging position and are non- separable. The tooth formations 35 and 36 are finely and carefully tooled for close tolerances and interengaging location and interlocking location. In a different construction, pin elements can be used for longitudinal engagement parallel to the line of division so that the two components 37 and 38 can be anchored together.

The second housing member 39 also includes two components 40 and 41 which are split similarly along diametrically opposite longitudinal lines to form tooth surfaces 42 and 43. The second housing member 39 has an externally threaded surface 44 for engagement with the internal threads 31 of the first housing member 30. There is also an abutting face 45 for engagement with the ends of the collar 25. Pin elements 47 are directed longitudinally parallel to the axis to secure the components 40 and 41 in interengagement. Instead of the pin formation, a suitable tooth formation could be used to secure the two components 40 and 41 together.

When the two housing members 30 and 39 are drawn together by applying torsional forces to the wrenching surfaces, the collars 25 are drawn inwardly to the central position 19 of the sleeve 10 to the point that the leading lips of the collars 25 interengage with the lips on the sleeve 10. Part of interengagement, affects a secure binding and locking of the sleeve 10 with the swaging collar 25. After this interengagement, the housing members 30 and 39 can be removed by separation of the component parts. Only three components of the union assembly remain. By this construction a light weight union assembly is provided with a minimum of components while still achieving effective sealing force between the union assembly components and the tubes 13 and 14.

Removal of the wrenching tool from the housing 30 permits for separation of the housing 30 into its component parts. Thereafter the removal of the pins 47 from the components of the second housing assembly 39 is easily achieved. This permits separation of the housing components 30 and 39 from the three components constituting the union assembly.

The union assembly can be used for repairing broken hydraulic tubing where the only tools required are two wrenches, one for each of the housing members. The housing members in their separable format can be re-used with different sleeves and swaging collars. In some formats it may be desirable to retain the housing components 30 and 39 in position over the collars 25. In other cases, the housing 30 and 39 may be removable by means different to separation upon a longitudinal split line. For instance, the housing members may be simply drawn axially off the tubes 13 and 14. In different formats the components of the housings 30 and 39 may be formed by more than two components for each housing.

Although the groove and land formation have been illustrated as constituting a square tooth-like formation, it should be clear that different cross sections of teeth could be used. The cross sectional area of each groove and land can vary according to desired sealing formations and constructions. This may be dependent on the material of the tubing and the sleeve.

The location of the lip relative to the land and groove and the tapered construction is such that interlocking of the swaging collars with the lip is effective. When the swaging collars cause the requisite degree of deformation of the sleeve 10, an effective biting seal is achieved between the outside wall of the tube 13 and 14 with the land and groove.

The construction has been illustrated with regard to a screw-together union assembly between sleeves and swaging collar. It is however possible that the components can be drawn together in the tapering interaction by a different formation thereby forming an assembly constituted by different removable housing 30 and 39.

The effective seal for high pressure hydraulic lines is achieved by having the longitudinal length of each of the grooves several times the thickness of the walls of the tubes 13 and 14. In other constructions, different groove and land cross sections can be provided.

Instead of housing numbers 30 and 39 for forming the union, it is possible to provide a wedge tool which can be operable hydraulically to effect the coupling action. Hydraulic or other pressure can operate the tool as required.

In FIG. 5 there is illustrated diagrammatically the connection of tubing to a fitting which has a permanent and separable end. Elements 100 and 101 form a permanent connection using a tool having the two housings 30 and 39. The components 30 and 39 have the same two components as described with reference to FIGS. 1 and 4, and operate similarly. Element 100 provides a shoulder 102 for the collar 103 of the component 30 to anchor against as the housing 30 and 39 are drawn together. When the element 101 is axially urged into the drawn up longitudinal position lip 104 engages in the rim 105 and the two elements 100 and 101 are locked together in a sealing relationship as described with regard to FIGS. 1 to 4. The housings 30 and 39 constituting the tool can then be removed. In this fashion the one element 100 is similar to a portion of sleeve 10 and the element 101 is similar to one of the collars 25 of FIGS. 1 to 4. The components 100 and 101 can then be affixed to any other additional elements, as necessary. The additional elements may be selectively separable from elements 100 and 101 according to desired characteristics and applications. Element 100 can be hollow or solid as desired.

In FIG. 6 a different diagrammatic construction is shown. The same tool using housings 30 and 39 is applied as earlier described with reference to FIGS. 1 to 5. Housing 30 cooperates with a shoulder 102 of element 106, which is a first element. A second element, namely tube 107 is secured to the inside surface of the tubular limb 108 of the element 106. The limb 108 is part of the first element 106. The element 106 and limb 108 constitute at least part of the sleeve 10 of the embodiment of FIGS. 1 to 4. The operation of the housings 30 and 39 effects tool operation so that deformed rings are formed to achieve a swaged connection of tube 107 with the elbow element 106. In different connections instead of an elbow 106 different shapes and configurations having different longitudinal or angular relationships to each other can be provided. The limb 109 of the elbow is right angularly directed relative to pipe 107. In this illustrative embodiment collar 110 is activated by the tool similar to one of the collars 25 of the construction of FIGS. 1 to 4. Different constructions and shapes are possible. For instance, instead of the elbow the component may be a T piece or Y piece. Thus different numbers of tubings can be secured to the fitting.

Many other examples of the invention exist each differing from other in matters of detail only. The scope of the invention is to be determined solely by the following claims.

We claim:

1. A union assembly for coupling the ends of a pair of tubes comprising a sleeve for positioning centrally over butting ends of a pair of tubes, the sleeve having an internal surface with a spaced series of circumferential lands and grooves, and an external surface having a pair of tapered external faces decreasing in diameter from a central portion of the sleeve towards opposite ends of the sleeve, and a swaging collar positioned in abutting relationship with each respective end of the sleeve such that as each collar is urged axially towards the central portion of the sleeve, the sleeve is compressed inwardly to deform the wall of the tubes into engagement in the grooves between the lands such that the tubes form a series of ring joints corresponding to the lands and grooves, wherein the tapered portion from each end of the sleeve ends in a raised lip spaced from the central portion of the sleeve, and wherein an indented circular slot is provided adjacently between each lip and the central portion, such that the central portion forms at least part of a wall for the slot, and each collar having means for engagement with the slot and wherein the coupling is effective to withstand pressures of several thousand pounds per square inch, and wherein the means for engagement in the collar includes a ring and also includes a slot, the ring and the slot in the collar accommodating the lip in the sleeve.

2. An assembly as claimed in claim 1 wherein there are at least two grooves for each tube end, and wherein the length of the groove is longer than the length of each land between the grooves.

3. An assembly as claimed in claim 3 wherein each end of the sleeve has a land which has a length substantially equal to the length of each groove.

4. An assembly as claimed in claim 1 wherein the slot in the collar being for engagement with the circumferential extent of the lip about the sleeve.

5. An assembly as claimed in claim 1 wherein each collar includes an indent circumferentially and internally about the collar at the collar end remote from the means for engagement with the slot.

6. An assembly as claimed in claim 1 wherein the collar defines a cross-sectional thickness, and wherein the thickness about the slot is less than the thickness remote from the slot.

7. A union assembly for coupling the ends of a pair of tubes comprising a sleeve for positioning centrally over butting ends of a pair of tubes, the sleeve having an internal surface with a spaced series of circumferential lands and grooves, and an external surface having a pair of tapered external faces decreasing in diameter from a central portion of the sleeve towards opposite ends of the sleeve, and a pair of swaging collars positioned in abutting relationship with the sleeve such that as the collars are urged axially towards the central portion of the sleeve, the sleeve is compressed inwardly to deform the wall of the tubes into engagement in the grooves between the lands such that the tubes form a series of ring joints corresponding to the lands and grooves, including a pair of housing member, the first housing member being directed to surround the central portion of the sleeve and having internal threads at one longitudinal end and an internal shoulder at the other end, the first housing member providing an external wrenching surface, and a second housing member externally threaded for engagement with the internal threads of the first housing member, the second housing member being provided with an external wrenching surface, at least one housing member having means for interengaging with selectively the sleeve or one of the collars and the other housing member having means for interengaging with the other collar with on one end such that as the housing members are moved relatively closer together, the housing members urge at least the interengaged swaging collar axially towards the central portion of the sleeve, and the housing members being subsequently removed from the sleeve.

8. An assembly as claimed in claim 7, wherein at least one of the housing members is constituted by at least two mating components, the components being separable along a longitudinal direction of the housing member.

9. An assembly as claimed in claim 8 including pins for interconnecting the components of said at least one of the housing members.

10. An assembly as claimed in claim 8 wherein the housing members constitute a tool.

11. A union assembly for coupling the ends of a pair of tubes comprising a sleeve for positioning over butting ends of a pair of tubes, the sleeve having an internal surface with lands and grooves, and an external surface having a pair of tapered external faces decreasing in diameter from a central portion of the sleeve towards opposite ends of the sleeve, and a pair of swaging collars positioned in adjacent relationship with the sleeve such that as the collars are urged axially towards the central portion of the sleeve, the sleeve is compressed inwardly to deform the wall of the tubes into engagement in the grooves including a pair of housing members, the first housing member being directed to surround the sleeve, the first housing member providing an external wrenching surface, and a second housing member threaded for engagement with the first housing member, the second housing member being provided with an external wrenching surface, at least one housing member having means for interengaging with selectively the sleeve or one of the collars and the other housing member having means for interengaging with the other on one end such that as the housing members are moved relatively closer together, the housing members urge at least the interengaged swaging collar axially towards the central portion of the sleeve, and wherein the housing members being subsequently removed from the sleeve, there being only the sleeve and collars constituting the assembly.

12. An assembly as claimed in claim 11, wherein at least one housing member is constituted by at least two mating and separable components.

13. An assembly as claimed in claim 12, including pins for interconnecting the components of at least one of the housing members.

14. An assembly as claimed in claim 11 wherein the housing members constitute a tool for interengaging the sleeve and swaging collars.

15. A union assembly for coupling the ends of a pair of tubes comprising a sleeve for positioning over butting ends of a pair of tubes, the sleeve having an internal surface with lands and grooves, and an external surface having a pair of tapered external faces decreasing generally smoothly in diameter from a central portion of the sleeve towards opposite ends of the sleeve, and a swaging collar positioned in adjacent relationship with each respective end of the sleeve such that each collar is urged axially towards the central portion of the sleeve, the sleeve is compressed inwardly to deform the wall of the tubes into engagement in the grooves, each collar being non-engaging of the other collar and wherein the tapered portion from each end of the sleeve ends in a raised lip spaced from the central portion of the sleeve and wherein an indented circular slot is provided adjacent each lip and the central portion of the sleeve and each collar having means for engagement with the respective slot and wherein the coupling is effective to withstand pressures of several thousand pounds per square inch, there being only the sleeve and collars constituting the assembly and wherein the means for engagement in the collar includes a ring and also includes a slot, the ring and the slot in the collar accommodating the lip in the sleeve.

16. An assembly as claimed in claim 15 wherein each collar includes an indent circumferentially and internally about the collar at the collar end remote from the means for engagement with the slot.

17. An assembly as claimed in claim 15 wherein the collar defines a cross-sectional thickness, and wherein the thickness about the slot is less than the thickness remote from the slot.

18. An assembly as claimed in claim 15 including a pair of housing member, the first housing member having means for interengaging the sleeve, the first housing member providing an external wrenching surface, and a second housing member threaded for engagement with the first housing member, the second housing member being provided with an external wrenching surface, said second housing member having means for interengaging with a collar on one end such that as the housing members are moved relatively closer together, the housing members urge at least the interengaged swaging collar axially towards the central portion of the sleeve, and wherein the housing members being subsequently removed from the sleeve, there being only the sleeve and collars constituting the assembly.

19. An assembly as claimed in claim 18 wherein at least one housing member is constituted by at least two mating and separable components.

20. An assembly as claimed in claim 19 including pins for interconnecting the components of said at least one of the housing members.

21. An assembly as claimed in claim 18 wherein the housing members constitute a tool for interengaging the sleeve and swaging collars.

* * * * *